(12) United States Patent
Cannata et al.

(10) Patent No.: US 9,945,729 B2
(45) Date of Patent: Apr. 17, 2018

(54) SYSTEMS AND METHODS FOR ENHANCED BOLOMETER RESPONSE

(71) Applicant: FLIR Systems, Inc., Wilsonville, OR (US)

(72) Inventors: Robert F. Cannata, Santa Barbara, CA (US); Kevin Peters, Santa Barbara, CA (US); Patrick Franklin, Santa Barbara, CA (US); Eric A. Kurth, Santa Barbara, CA (US); James L. Dale, Pocatello, ID (US); Tommy Marx, Santa Barbara, CA (US); Craig Shott, Santa Barbara, CA (US); Reza Salafian, Santa Barbara, CA (US); Richard E. Bornfreund, Santa Barbara, CA (US); Saumya Kothari, Charlotte, NC (US)

(73) Assignee: FLIR SYSTEMS, INC., Wilsonville, OR (US)

( * ) Notice: Subject to any disclaimer, the term of this patent is extended or adjusted under 35 U.S.C. 154(b) by 80 days.

(21) Appl. No.: 14/730,116

(22) Filed: Jun. 3, 2015

(65) Prior Publication Data
US 2017/0082497 A1 Mar. 23, 2017

Related U.S. Application Data

(60) Provisional application No. 62/007,738, filed on Jun. 4, 2014.

(51) Int. Cl.
*G01J 5/24* (2006.01)
*G01J 5/04* (2006.01)
(Continued)

(52) U.S. Cl.
CPC ............... *G01J 5/24* (2013.01); *G01J 5/024* (2013.01); *G01J 5/046* (2013.01); *G01J 5/0853* (2013.01);
(Continued)

(58) Field of Classification Search
CPC .... G01J 5/24; G01J 5/024; G01J 5/046; G01J 5/0853; G01J 5/20; G01J 2005/0077
See application file for complete search history.

(56) References Cited

U.S. PATENT DOCUMENTS 6,690,014 B1 * 2/2004 Gooch ..................... G01J 5/20
250/338.4
7,718,965 B1 * 5/2010 Syllaios .................... G01J 5/02
250/338.1
(Continued)

FOREIGN PATENT DOCUMENTS

CN 1492992 4/2004
WO WO 02/055973 7/2002

*Primary Examiner* — Christine Sung
(74) *Attorney, Agent, or Firm* — Haynes and Boone, LLP

(57) ABSTRACT

Systems and methods may be provided for forming enhanced infrared absorption microbolometers. An enhanced infrared absorption microbolometer may include a metal cap formed from a thin layer of oxidizing metal such as titanium and/or a titanium oxide. The metal cap may be formed within a bridge portion of the microbolometer. The bridge portion may include other layers such as first and second absorber layers disposed on opposing sides of a layer of temperature sensitive resistive material. The layer of temperature sensitive resistive material may be located between the metal cap and a reflecting metal layer formed on a readout integrated circuit for the microbolometer.

23 Claims, 7 Drawing Sheets

(51) Int. Cl.
*G01J 5/02* (2006.01)
*G01J 5/20* (2006.01)
*G01J 5/08* (2006.01)
*G01J 5/00* (2006.01)

(52) U.S. Cl.
CPC ......... *G01J 5/20* (2013.01); *G01J 2005/0077* (2013.01)

(56) References Cited

U.S. PATENT DOCUMENTS

| | | | |
|---|---|---|---|
| 2008/0094168 A1* | 4/2008 | Hynes | H01L 23/5228 338/22 SD |
| 2009/0152467 A1* | 6/2009 | Cheon | G01J 5/02 250/338.4 |
| 2010/0038540 A1* | 2/2010 | Hannebauer | G01J 3/36 250/338.1 |
| 2010/0148067 A1 | 6/2010 | Cheon et al. | |
| 2011/0248374 A1 | 10/2011 | Akin et al. | |
| 2012/0312992 A1 | 12/2012 | Cannata et al. | |
| 2014/0159032 A1* | 6/2014 | Syllaios | H01L 27/14618 257/43 |
| 2014/0175284 A1* | 6/2014 | Roh | G01J 5/0853 250/338.4 |

* cited by examiner

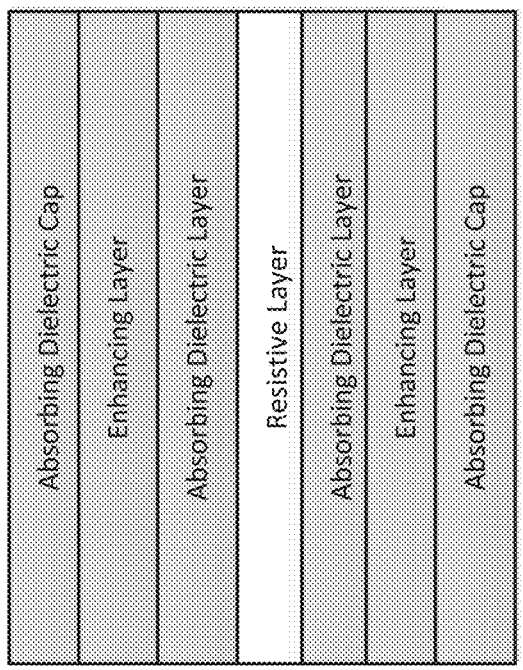
Fig. 4b
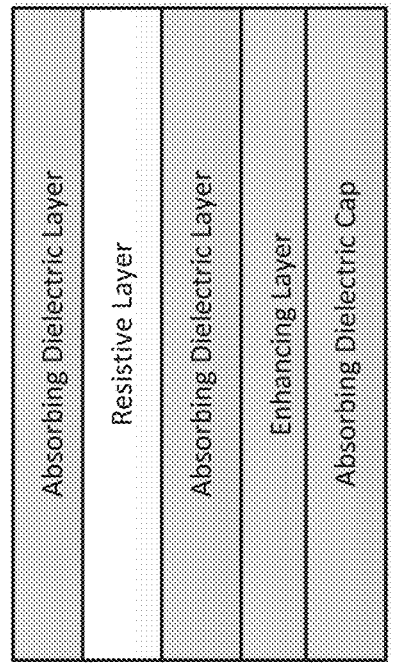
Fig. 4c
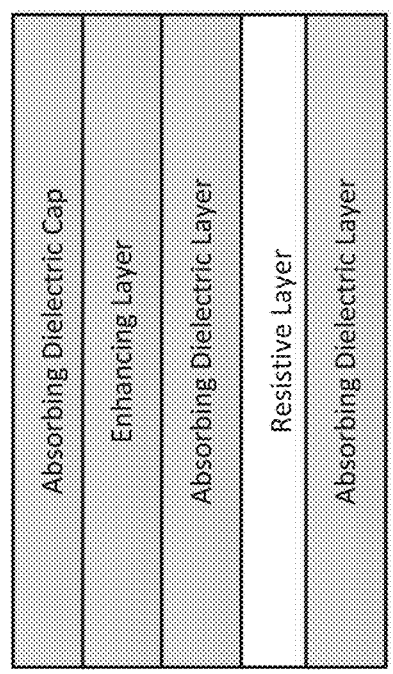
Fig. 4d
Fig. 4e

SYSTEMS AND METHODS FOR ENHANCED BOLOMETER RESPONSE

CROSS REFERENCE TO RELATED APPLICATIONS

This application claims the benefit of U.S. Provisional Patent Application No. 62/007,738 filed Jun. 4, 2014 and entitled "SYSTEMS AND METHODS FOR ENHANCED BOLOMETER RESPONSE," which is incorporated by reference in its entirety.

TECHNICAL FIELD

One or more embodiments of the invention relate generally to infrared cameras and, more particularly, to enhancing the bolometer response through optimization of the infrared absorption of the microbolometers for infrared cameras.

BACKGROUND

As imaging devices become smaller, each light-sensitive element in the imaging devices tend to have a reduced light-collecting area. For this reason, it is desirable to maximize the infrared absorption of each light-sensitive element so that as much of the infrared energy that is incident on the light-sensitive element is collected and detected. However, it can be challenging to improve the absorption of a detector using conventional methods.

As a result, there is a need for improved techniques for enhancing the infrared absorption of light-sensitive elements for imaging devices such as microbolometers for infrared cameras.

SUMMARY

It has recently been discovered that, contrary to conventional wisdom, the infrared absorption of a microbolometer may be enhanced by including a metal layer in the light-sensitive portion of the microbolometer. This is contrary to conventional wisdom as one skilled in the art would expect a metal layer in the light-sensitive region of a microbolometer to reflect incident infrared radiation rather than absorb it, thereby reducing the infrared absorption of the microbolometer. However, a microbolometer having a metal layer may improve the absorption of incident infrared radiation compared with conventional microbolometers. Systems and methods are disclosed for providing enhanced infrared absorption microbolometers.

According to an embodiment, a microbolometer is disclosed that includes a bottom absorbing dielectric layer(s), a top absorbing dielectric layer(s), a temperature sensitive resistive layer disposed between the bottom and top absorbing dielectric layer(s), and a metal cap formed on the top absorbing dielectric layer. The metal cap may include a layer of oxidizing metal that is disposed at or near a top surface of the bridge (e.g., that forms a topmost surface of the microbolometer bridge). The metal cap may include a titanium layer formed from titanium (Ti), a titanium oxide (TiOx) or a combination of Ti and TiOx (as examples). For example, the metal cap may be formed from a stack of titanium and TiOx having a thickness of, for example, between 10 Angstroms and 1500 Angstroms.

According to another embodiment, a microbolometer is disclosed that includes a bottom absorbing dielectric layer(s), a top absorbing dielectric layer(s), an absorbing metal cap layer formed on the bottom absorbing dielectric layer, another absorbing dielectric layer(s), a temperature sensitive resistive layer disposed between the bottom and top absorbing dielectric layer(s), and a metal cap formed on the top absorbing dielectric layer. The metal cap may include a layer of oxidizing metal that is disposed at or near a top surface of the bridge (e.g., that forms a topmost surface of the microbolometer bridge). The metal cap may include a titanium layer formed from titanium (Ti), a titanium oxide (TiOx) or a combination of Ti and TiOx (as examples). For example, the metal cap may be formed from a stack of titanium and TiOx having a thickness of, for example, between 10 Angstroms and 1500 Angstroms. The metal cap may also be fully or partially encapsulated in a dielectric material.

According to another embodiment, a method is disclosed that may include forming a first metal layer on a readout integrated circuit substrate, forming a sacrificial layer on the first metal layer, forming a first absorbing dielectric layer over the sacrificial layer, forming a layer of temperature sensitive resistive material on the first absorbing dielectric layer, forming a second absorbing dielectric layer over the layer of temperature sensitive resistive material, forming a second metal layer on the second absorbing dielectric layer, optionally depositing a dielectric layer that fully or partially encloses the second metal layer, and removing the sacrificial layer.

According to another embodiment, a method is disclosed that may include forming a first metal layer on a readout integrated circuit substrate, forming a sacrificial layer on the first metal layer, forming a first absorbing dielectric layer over the sacrificial layer, forming a second metal layer over the first absorbing dielectric layer, forming a second absorbing dielectric layer over the second metal layer, forming a layer of temperature sensitive resistive material on the second absorbing dielectric layer, forming a third absorbing dielectric layer over the layer of temperature sensitive resistive material, forming a third metal layer on the third absorbing dielectric layer, optionally depositing a dielectric layer that fully or partially encloses the third metal layer, and removing the sacrificial layer.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 4a-4e show cross-sectional views of a portion of an enhanced absorption microbolometer in accordance with various embodiments.

Embodiments of the invention and their advantages are best understood by referring to the detailed description that follows. It should be appreciated that like reference numerals are used to identify like elements illustrated in one or more of the figures.

DETAILED DESCRIPTION

Systems and methods are disclosed herein to provide enhanced infrared absorption detectors for an infrared detector device. In one embodiment, an enhanced infrared absorption detector may be a microbolometer having a resistive layer sandwiched between two absorber layers and having an absorption enhancing layer on one or both of the two absorber layers that increases the absorption of the microbolometer to infrared radiation in comparison with conventional microbolometers. Having the absorption enhancing layer on both the top and bottom of the microbolometer bridge can improve the absorption of both incident and reflected infrared radiation. The absorption enhancing layer may, for example, be formed from metal. In various embodiments, the infrared detector device may be included in an electronic device or other imaging system.

Figure 1:
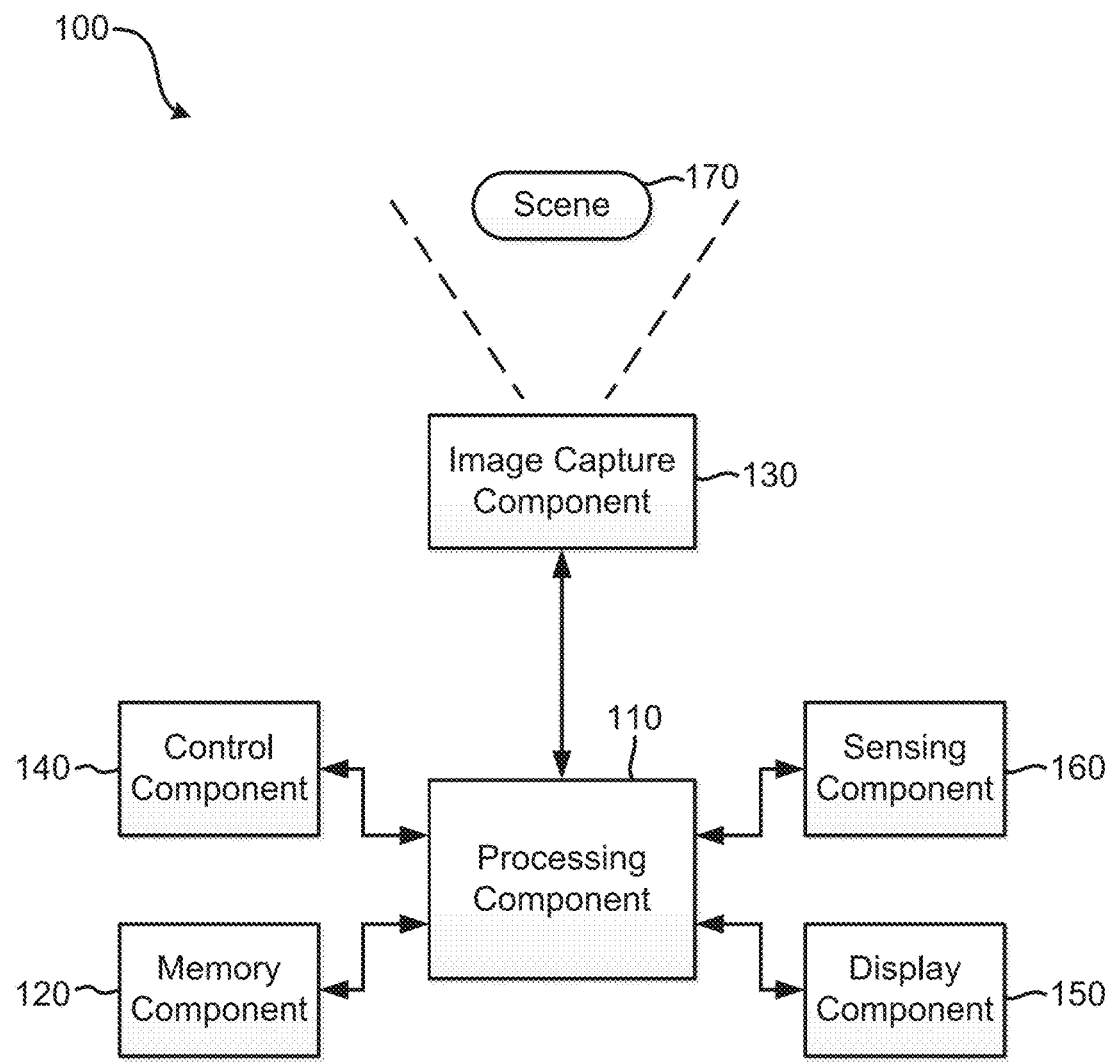
FIG. 1 shows a block diagram illustrating a system for capturing images in accordance with an embodiment.

Referring now to FIG. 1, a block diagram is shown illustrating a system 100 (e.g., an infrared camera) for capturing and processing images in accordance with one or more embodiments. System 100 may include, in one implementation, a processing component 110, a memory component 120, an image capture component 130, a control component 140, and a display component 150. Optionally, system 100 may include a sensing component 160.

System 100 may represent for example an infrared imaging device, such as an infrared camera, to capture and process images, such as video images of a scene 170. The system 100 may represent any type of infrared camera adapted to detect infrared radiation and provide representative data and information (e.g., infrared image data of a scene) or may represent more generally any type of electro-optical sensor system. System 100 may comprise a portable device and may be incorporated, e.g., into a vehicle (e.g., an automobile or other type of land-based vehicle, an aircraft, a marine craft, or a spacecraft) or a non-mobile installation requiring infrared images to be stored and/or displayed or may comprise a distributed networked system.

In various embodiments, processing component 110 may comprise any type of a processor or a logic device (e.g., a programmable logic device (PLD) configured to perform processing functions). Processing component 110 may be adapted to interface and communicate with components 120, 130, 140, and 150 to perform method and processing steps and/or operations, as described herein such as controlling biasing and other functions (e.g., values for elements such as variable resistors and current sources, switch settings for timing such as for switched capacitor filters, ramp voltage values, etc.) along with conventional system processing functions as would be understood by one skilled in the art.

Memory component 120 comprises, in one embodiment, one or more memory devices adapted to store data and information, including for example infrared data and information. Memory device 120 may comprise one or more various types of memory devices including volatile and non-volatile memory devices. Processing component 110 may be adapted to execute software stored in memory component 120 so as to perform method and process steps and/or operations described herein.

Image capture component 130 comprises, in one embodiment, any type of image sensor, such as for example one or more infrared sensors (e.g., any type of multi-pixel infrared detector, such as a focal plane array with bolometer) for capturing infrared image data (e.g., still image data and/or video data) representative of an image, such as scene 170. In one implementation, the infrared sensors of image capture component 130 provide for representing (e.g., converting) the captured image data as digital data (e.g., via an analog-to-digital converter included as part of the infrared sensor or separate from the infrared sensor as part of system 100). In one aspect, the infrared image data (e.g., infrared video data) may include non-uniform data (e.g., real image data) of an image, such as scene 170. Processing component 110 may be adapted to process the infrared image data (e.g., to provide processed image data), store the infrared image data in memory component 120, and/or retrieve stored infrared image data from memory component 120. For example, processing component 110 may be adapted to process infrared image data stored in memory component 120 to provide processed image data and information (e.g., captured and/or processed infrared image data).

In various embodiments, image capture component 130 may include an array of enhanced absorption detector elements for detecting, for example, infrared radiation such as thermal radiation. In one embodiment, an enhanced absorption detector element may include a microbolometer having a temperature sensitive resistive layer such as a layer of vanadium oxide (Vox) disposed between two absorber layers (e.g., first and second layers that absorb infrared radiation) and having a metal cap on one of the two absorber layers that increases the absorption of infrared radiation of the microbolometer in comparison with conventional microbolometers. The metal cap may, for example, be formed from an enhancing metal layer.

Control component 140 may include, in one embodiment, a user input and/or interface device, such as a rotatable knob (e.g., potentiometer), push buttons, slide bar, keyboard, etc., that is adapted to generate a user input control signal. Processing component 110 may be adapted to sense control input signals from a user via control component 140 and respond to any sensed control input signals received therefrom. Processing component 110 may be adapted to interpret such a control input signal as a parameter value, as generally understood by one skilled in the art.

In one embodiment, control component 140 may include a control unit (e.g., a wired or wireless handheld control unit) having push buttons adapted to interface with a user and receive user input control values. In one implementation, the push buttons of the control unit may be used to control various functions of the system 100, such as autofocus, menu enable and selection, field of view, brightness, contrast, noise filtering, high pass filtering, low pass filtering, and/or various other features as understood by one skilled in the art.

Display component 150 may include, in one embodiment, an image display device (e.g., a liquid crystal display (LCD) or various other types of generally known video displays or monitors). Processing component 110 may be adapted to display image data and information on the display component 150. Processing component 110 may be adapted to retrieve image data and information from memory component 120 and display any retrieved image data and information on display component 150. Display component 150 may include display electronics, which may be utilized by processing component 110 to display image data and information (e.g., infrared images). Display component 150 may be adapted to receive image data and information directly from image capture component 130 via the processing component 110, or the image data and information may be transferred from memory component 120 via processing component 110.

Optional sensing component 160 may include, in one embodiment, one or more sensors of various types, depending on the application or implementation requirements, as would be understood by one skilled in the art. The sensors of optional sensing component 160 provide data and/or information to at least processing component 110. In one aspect, processing component 110 may be adapted to communicate with sensing component 160 (e.g., by receiving sensor information from sensing component 160) and with image capture component 130 (e.g., by receiving data and information from image capture component 130 and providing and/or receiving command, control, and/or other information to and/or from one or more other components of system 100).

In various implementations, sensing component 160 may provide information regarding environmental conditions, such as outside temperature, lighting conditions (e.g., day, night, dusk, and/or dawn), humidity level, specific weather conditions (e.g., sun, rain, and/or snow), distance (e.g., laser rangefinder), and/or whether a tunnel or other type of enclosure has been entered or exited. Sensing component 160 may represent conventional sensors as generally known by one skilled in the art for monitoring various conditions (e.g., environmental conditions) that may have an effect (e.g., on the image appearance) on the data provided by image capture component 130.

In some implementations, optional sensing component 160 (e.g., one or more of sensors) may include devices that relay information to processing component 110 via wired and/or wireless communication. For example, optional sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of system 100 may be combined and/or implemented or not, as desired or depending on the application or requirements, with system 100 representing various functional blocks of a related system. In one example, processing component 110 may be combined with memory component 120, image capture component 130, display component 150, and/or optional sensing component 160. In another example, processing component 110 may be combined with image capture component 130 with only certain functions of processing component 110 performed by circuitry (e.g., a processor, a microprocessor, a logic device, a microcontroller, etc.) within image capture component 130. Furthermore, various components of system 100 may be remote from each other (e.g., image capture component 130 may comprise a remote sensor with processing component 110, etc. representing a computer that may or may not be in communication with image capture component 130).

Figure 2:
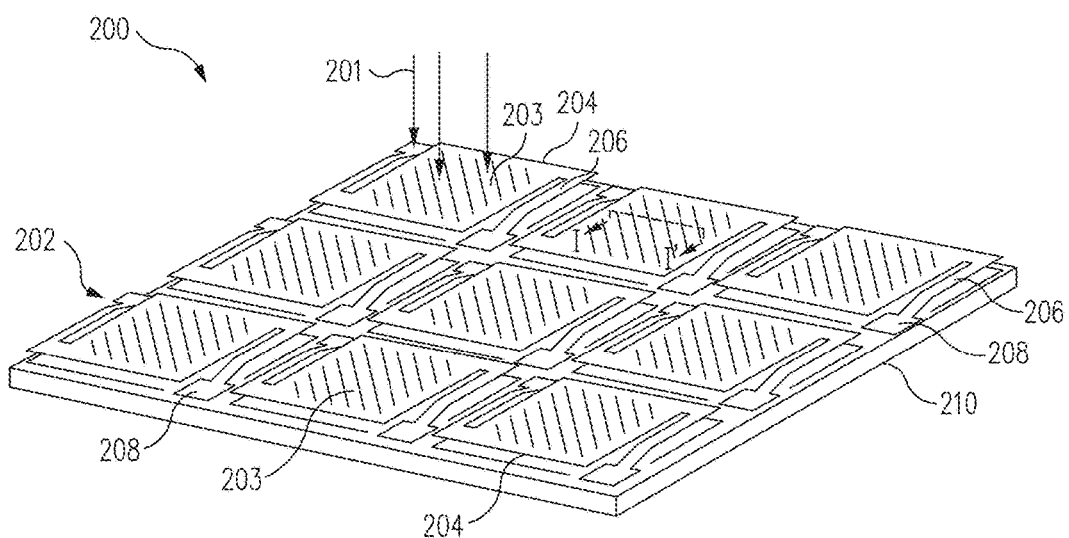
FIG. 2 shows a perspective view illustrating a focal plane array having an enhanced responsivity microbolometer array in accordance with an embodiment.

FIG. 2 shows a perspective view illustrating an infrared detector device 200 having an array 202 of infrared detector elements 204 that may be used to capture image data such as infrared image data for, for example, image capture component 130 of FIG. 1. As shown in the example of FIG. 2, array 202 may include coupling members such as legs 206 that couple a bridge portion 203 of each detector element 204 to one or more contacts 208. Each contact 208 may couple one or more associated detector elements 204 to associated readout circuitry of readout integrated circuit (ROIC) 210. According to various embodiments, each contact 208 may be attached to a portion of a leg 206 that bends downward toward ROIC 210 so that contact 208 contacts circuitry in ROIC 210 and/or each contact 208 may include a portion that extends downward from leg 206 to the surface of ROIC 210. Legs 206 may be formed from, for example, titanium, nickel chromium, or other suitable conductive materials.

In one suitable configuration that is sometimes discussed herein as an example, device 200 may be a focal plane array that may be implemented in, for example, image capture component 130 of FIG. 1. Each detector element 204 may be formed from one or more layers of material such as one or more absorber layers, one or more passivation layers, one or more temperature sensitive resistive layers, one or more cap layers, one or more overglass layers, one or more antireflective layers, and/or other layers or elements. In one embodiment, a topmost layer of bridge 203 of each detector element 204 may be an enhancing layer formed from, for example, metal. The enhancing layer may increase the absorption of that detector to infrared radiation such as infrared light 201 (e.g., by decreasing the minimum wavelength of infrared radiation that is absorbed from, for example, approximately eight microns to, for example, approximately seven microns and/or by increasing the amount of infrared radiation that is absorbed at some or all wavelengths). Each detector element 204 may, for example, be a microbolometer.

In a focal plane array configuration, ROIC 210 may include an ROIC substrate formed from silicon or germanium (as examples). Detector elements 204 may be arranged to convert incident light such as infrared light 201 into detectable electrical signals based on changes in electrical properties of the detector element (e.g., changes in resistivity) due to changes in temperature of the detector element when the light 201 is incident. Each infrared detector element 204 may be coupled via one of contacts 208 to an associated unit cell (not shown) formed on readout integrated circuit 210 for processing and reading out the electrical signals.

ROIC 210 may incorporate circuitry that is placed in spatial proximity to the detector elements 204 to perform the functions of detector interface and multiplexing. The circuitry associated with a particular microbolometer detector 204 may be located in the substrate directly beneath the detector and may be referred to as the unit cell. ROIC 210 may include an array of unit cells, column amplifiers, a column multiplexer, and a row multiplexer integrated on to a single ROIC silicon die. The microbolometer array 202 may be constructed on top of the unit cell array. ROIC 210 may further include bias generation and timing control circuitry and an output amplifier.

Each microbolometer 204 in the array 202 may communicate with ROIC 210 via legs 206 and contacts 208. For example, a first contact 208 may be used to provide a reference or bias voltage to the microbolometer and a second contact 208 may be used to provide a signal path from the microbolometer to the ROIC by which signals corresponding to infrared light absorbed by the microbolometer can be readout. Further descriptions of ROIC and microbolometer circuits may be found in U.S. Pat. No. 6,028,309, which is incorporated by reference in its entirety herein for all purposes.

Figure 3:
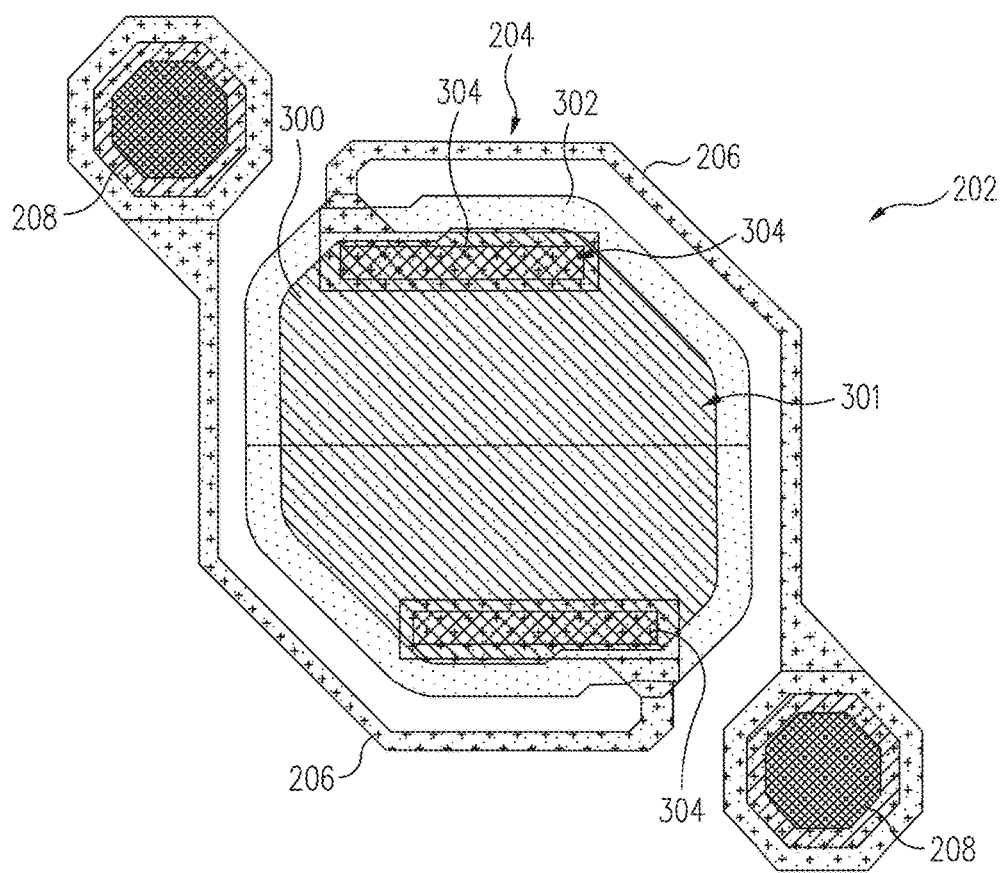
FIG. 3 shows a top view of a portion of an enhanced absorption microbolometer array in accordance with an embodiment.

FIG. 3 shows a more detailed physical layout diagram of a portion of a microbolometer array 202 in accordance with an embodiment. Microbolometer array 202 may include an array of microbolometers 204, which may be arranged in rows and columns of detectors. However, it should be understood that microbolometer array 202 is an example of an array (or a portion of an array) in accordance with one or more embodiments.

According to an embodiment, microbolometers 204 may each include a resistive material 300, which may be formed of a high temperature coefficient of resistivity (TCR) material (e.g., vanadium oxide (VOx) or amorphous silicon). Resistive material 300 may be suspended above ROIC 210 on a bridge 302, with resistive material 300 coupled to its contacts 208 via legs 206. Legs 206 may be attached to resistive material 300 through a resistive material contact 304 (e.g., a leg metal to resistive material contact). Resistive material 300 may be covered by one or more other layers of material (e.g., an absorber layer, one or more dielectric layers, and/or an enhancing layer or metal cap). For example, a thin metal layer or metal cap may be formed at or near top surface 301 of microbolometer 204 and may enhance the absorption of microbolometer 204 to incident infrared light.

When light such as infrared light 201 of FIG. 2 is incident on an infrared detector element 204 such as a microbolometer, the light may first reach the enhancing metal layer, may be partially or completely absorbed by the enhancing metal layer, and/or may partially or completely pass through the enhancing layer and be partially or completely absorbed by one or more absorbing layers in the bridge portion of the microbolometer. Some of the light that passes into the bridge portion of the microbolometer may pass through the bridge portion and be reflected by a reflecting metal layer formed beneath the bridge on the readout integrated circuit. Some or all of the reflected light from the reflecting metal layer may again pass from the backside of the bridge portion into the bridge portion of the microbolometer and be partially or completely absorbed by one or more absorbing layers and/or the enhancing metal layer. In some circumstances, multiple reflections between the bridge and the reflecting metal layer on the ROIC may occur.

Figure 4A:
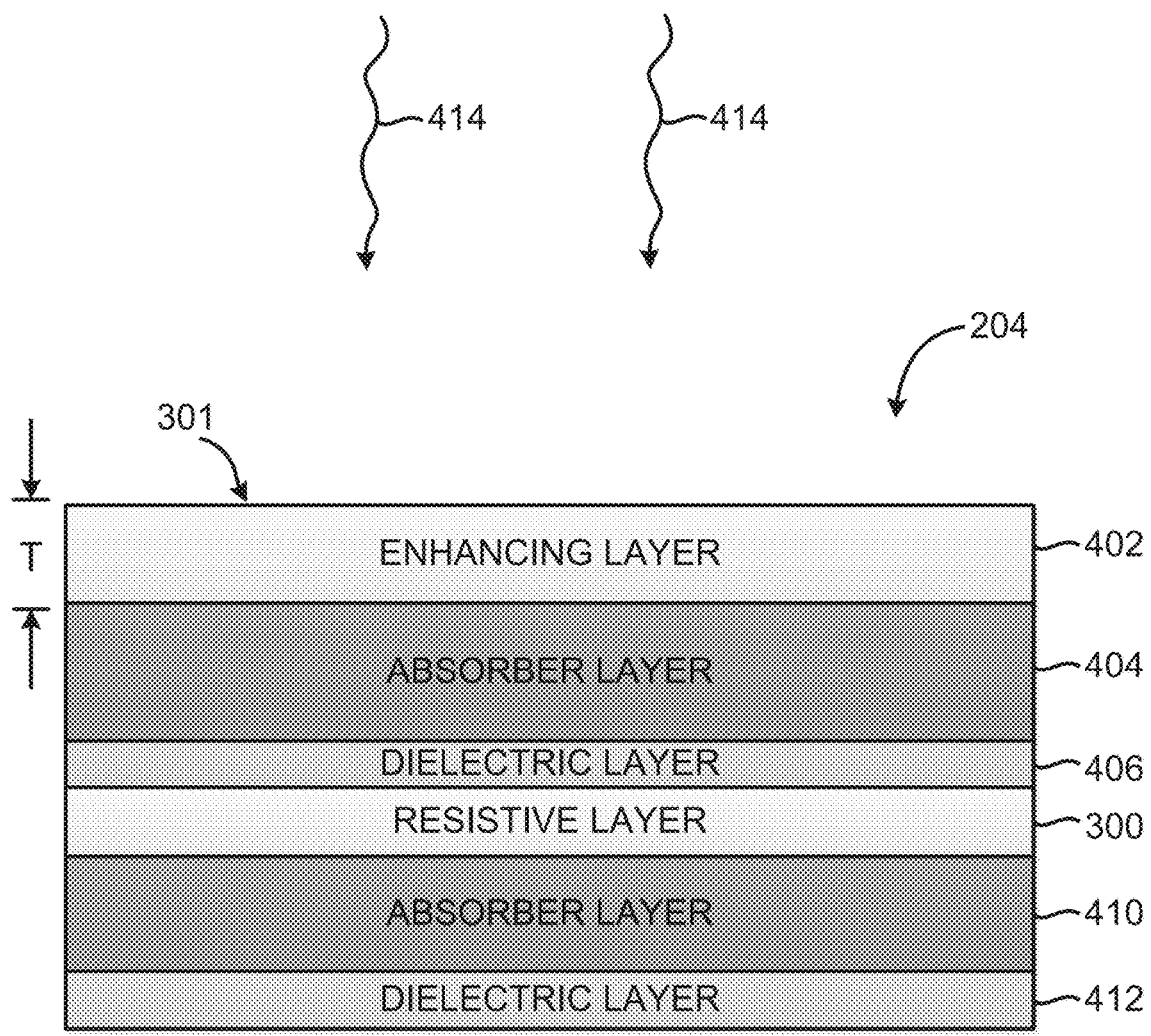

FIGS. 4a-4e show cross-sectional diagrams of a portion of a microbolometer 204 (e.g., along line I-I' of FIG. 2) that may be suspended by bridge 302 of FIG. 3 according to various embodiments. As shown in FIG. 4a, the light-sensitive portion of microbolometer 204 may include multiple layers of material such as resistive layer 300, a first light absorbing layer such as absorber layer 404 disposed on a first side of resistive layer 300, a second light absorbing layer such as absorber layer 410 formed on an opposing second side of resistive layer 300, and an infrared absorption enhancing layer such as enhancing layer 402 formed on the first light absorbing layer 404.

As shown in FIG. 4a, enhancing layer 402 may form a topmost layer of microbolometer 204 so that top surface 301 of microbolometer 204 at which incident light such as infrared light 414 is received by the microbolometer is formed from a top (outer) surface of enhancing layer 402. Enhancing layer 402 may, for example, be a thin layer of metallic material such as an oxidizing metal that forms a metal cap for the microbolometer. For example, enhancing layer 402 may be formed from titanium, titanium oxide, a combination of Ti and TiOx, aluminum, titanium nitride, nickel, iron, zinc, platinum, tantalum, chrome, other transition metals, other metals, alloys of these metals, oxides of these materials and/or a combination of these metals and their oxides.

Enhancing layer 402 may have a thickness T and a composition that provides an enhanced responsivity for microbolometer 204 without affecting other critical behavior and/or performance parameters such as noise requirements for the microbolometer. As examples, thickness T may be between 200 Angstroms and 500 Angstroms, between 295 Angstroms and 305 Angstroms, less than 1500 Angstroms, less than 400 Angstroms, greater than one Angstrom, less than 350 Angstroms, or between 275 and 325 Angstroms. It has been shown that providing a metal layer such as enhancing layer 402 may increase the infrared absorption of microbolometer 204 by as much as or more than ten percent in comparison with conventional microbolometers that do not include an enhancing metal cap layer.

Enhancing layer 402 may be formed using an etch back process, a liftoff process, or other processing methods that, after deposition of a metallic material, leaves a thin film of the metallic material on the top surface of the bridge region of the detector. In one embodiment, enhancing layer 402 may also be formed on some or all of the legs for each microbolometer.

In one example, resistive layer 300 may be comprised of a temperature sensitive resistive material. For example, the resistive layer may be formed from vanadium oxide, nickel oxide, alpha-silicon, alpha-SiGe, titanium oxide, molybdenum oxide, and/or a diode element such as p+/n-doped poly-silicon junction. In one example, absorber layers 404 and 410 may be formed from various materials, such as silicon nitride (e.g., $Si_3N_4$), silicon dioxide ($SiO_2$), silicon oxynitride (e.g., SiON), and/or carbon/graphite based absorbers, as would be understood by one of ordinary skill in the art. Further descriptions of suitable absorber layers may be found in U.S. Pat. No. 9,029,783, which is incorporated by reference in its entirety herein for all purposes.

The structures of microbolometer 204 shown in FIG. 4a are merely illustrative. For example, in one embodiment, microbolometer 204 may include a first dielectric layer 406 disposed between absorber layer 404 and resistive layer 300 and a second dielectric layer 412 disposed on the bottom of resistive layer 300 and absorber layer 410 as shown in FIG. 4a. However, this is merely illustrative. In various embodiments, microbolometer 204 may include enhancing layer 402, resistive layer 300, at least one infrared absorbing layer, and any suitable combination of other layers such as passivation layers, antireflection layers, multilayer absorbing layers (e.g., one or more absorbing layers disposed above and/or below the resistive layer having various indices of refraction and formed form the same and/or different materials), dielectric layers such as dielectric layers 406 and/or 412, and/or other suitable layers.

In one example, dielectric layers 406 and 412 may be formed from silicon dioxide ($SiO_2$). In some embodiments, absorber layers 404 and/or 410 may each include multiple layers of material including silicon nitride, silicon oxynitride, silicon oxide or other suitable absorbing materials. In certain embodiments, absorber layers 404 and/or 410 are formed from one or more absorbing dielectric materials such as silicon nitride.

FIGS. 4b-4e illustrate other embodiments of a portion of an enhanced absorption microbolometer. As shown in FIGS. 4b-4e, the light-sensitive portion of microbolometer 204 may include multiple layers of material such as resistive layer 300, a first light absorbing layer such as absorbing dielectric layer 404 disposed on a first side of resistive layer 300, a second light absorbing layer such as absorbing dielectric layer 410 or absorbing dielectric cap 416 formed on an opposing second side of resistive layer 300, and an infrared absorption enhancing layer such as enhancing layer 402. In the embodiment of FIG. 4b, an additional absorbing dielectric layer 418 is provided. In various embodiments, the enhancing layer 402 may be fully or partially encapsulated with an absorbing dielectric material, e.g., absorbing dielectric cap 416.

As can be seen from the figures, the enhancing layer 402 may be disposed at various locations in the stack, and may be disposed at multiple locations. For example, FIGS. 4b and 4c show the enhancing layer 402 near the top of the stack, while FIG. 4d shows the enhancing layer 402 near the bottom of the stack. FIG. 4c shows two enhancing layers 402 in the stack, one layer near the top and a second layer at the bottom of the stack.

Figure 5:
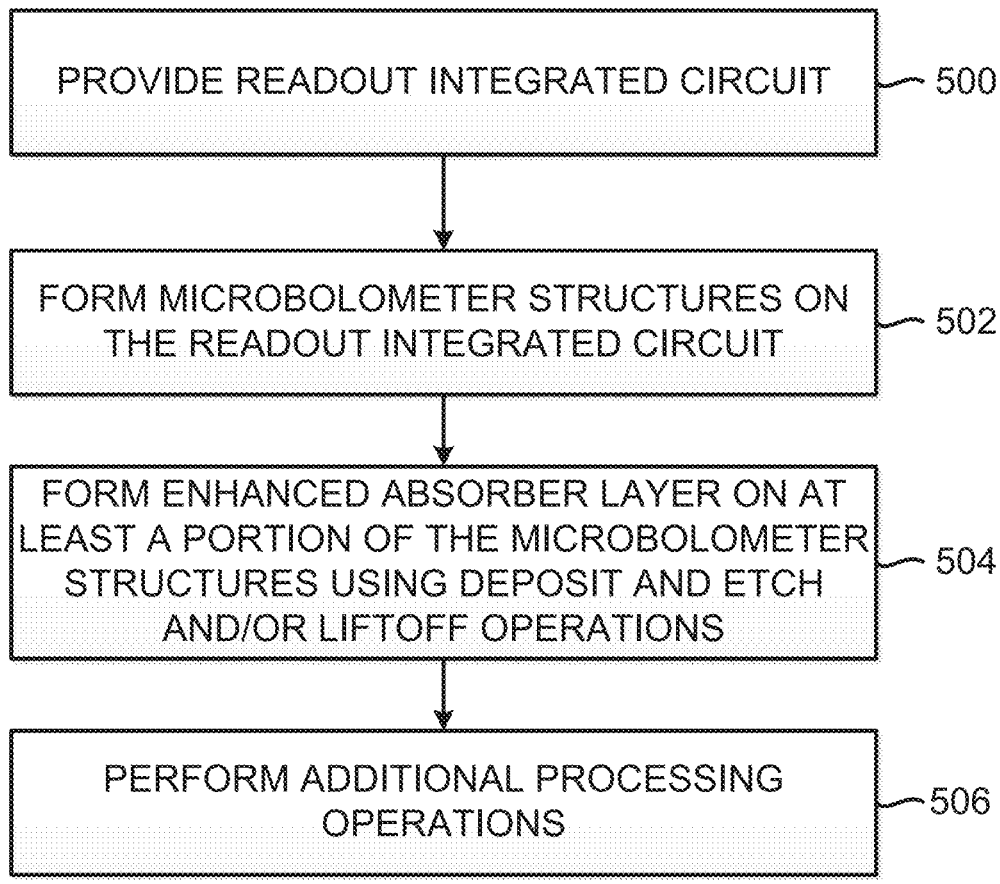
FIG. 5 shows a flow diagram illustrating a method of forming one or more enhanced absorption microbolometers in accordance with an embodiment.

FIG. 5 is a flowchart of illustrative operations that may be performed for fabricating a device such an infrared imaging device such as device 200 of FIG. 2 having enhanced infrared absorption microbolometers such as microbolometers 204 of FIGS. 2, 3, and 4a-4e.

At block 500, a substrate such as a readout integrated circuit substrate for an infrared detector device such as a focal plane array may be provided.

At block 502, microbolometer structures such as an array of microbolometer bridges suspended on legs that couple the bridges to corresponding contacts on the ROIC substrate may be formed. Forming the microbolometer structures may include various photomasking, etching, deposition, patterning, liftoff and/or other suitable processes. Forming the microbolometer structures may include incorporating a sacrificial layer in or among the microbolometer structures.

At block 504, an enhanced absorber layer such as enhancing layer 402 of FIG. 4 may be formed on at least a portion of the microbolometer structures using deposit and etch processes and/or liftoff operations. For example, the enhanced absorber layer may be formed on a light-sensitive portion of the microbolometer that is to be suspended above the ROIC substrate by the microbolometer bridge. In some embodiments, the enhanced absorber layer may be formed on some or all of the leg structures of the microbolometer.

At block 506, additional processing operations may be performed to form the focal plane array. For example, additional processing operations may include removing (e.g., by etching) the sacrificial layer to release the microbolometers and leave the bridge portions and some or all of the legs suspended above the ROIC. Additional processing operations may include other operations such as wafer dicing operations, other wafer level packaging (WLP) processes, coating operations, testing operations and/or other suitable operations. For example, a focal plane array having microbolometers with enhanced absorbing layers may be incorporated in a microbolometer vacuum package assembly (VPA) using WLP techniques such as those described in U.S. Provisional Patent Application No. 61/801,596 and U.S. Provisional Patent Application No. 61/469,651, which are incorporated herein by reference in their entireties.

Figure 6:
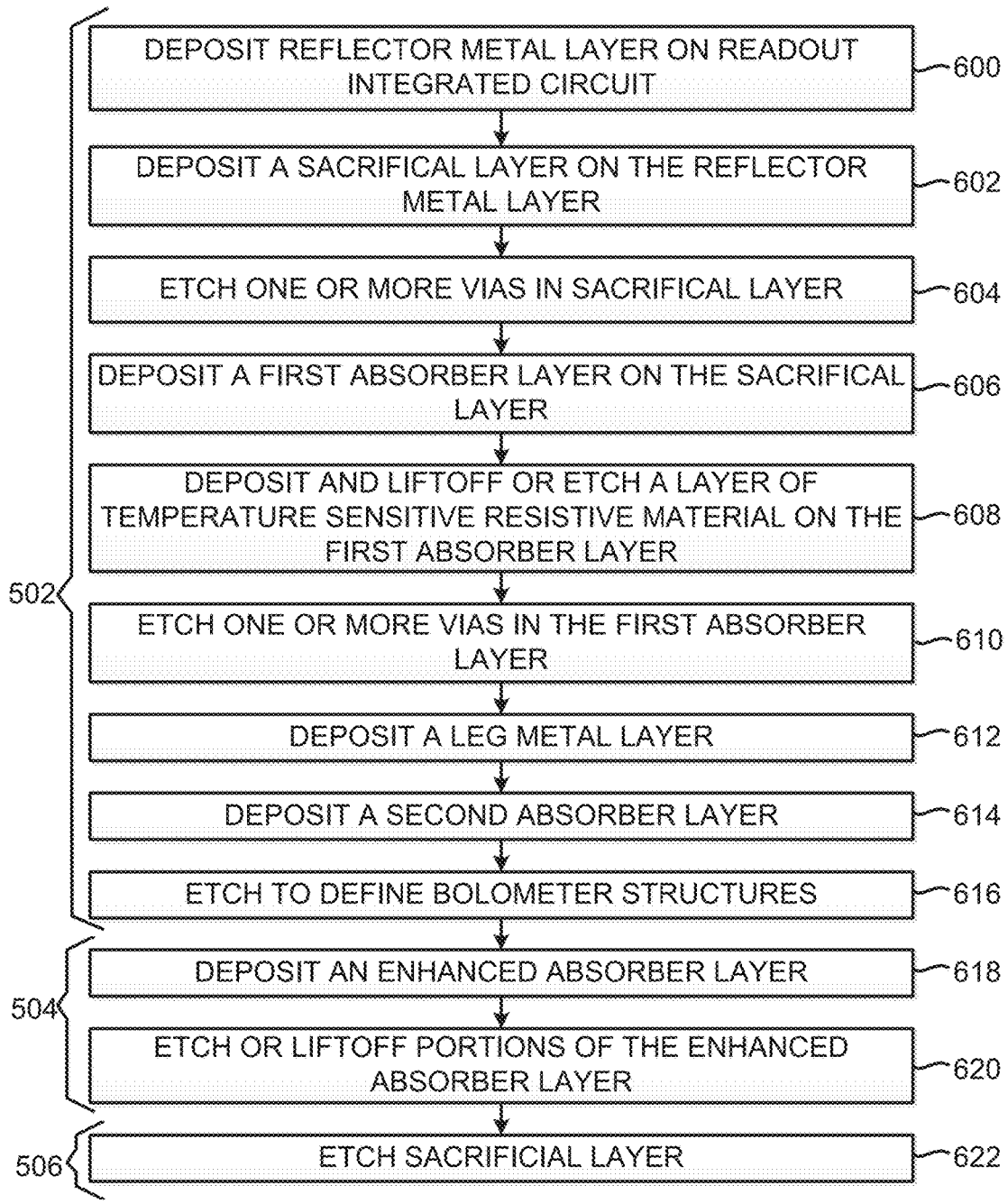
FIG. 6 shows a flow diagram illustrating further details of a method of forming one or more enhanced absorption microbolometers in accordance with an embodiment.

FIG. 6 is a flowchart showing further details of illustrative operations of FIG. 5 according to an embodiment. For example, the operations described above in connection with block 502 of FIG. 5 may include the operations described below in connection with blocks 600-616. For example, the operations described above in connection with block 504 of FIG. 5 may include the operations described below in connection with blocks 618-620, and the operations described above in connection with block 506 of FIG. 5 may include the operations described below in connection with block 622.

At block 600, a metal layer such as a reflector metal layer may be formed on a substrate such as a readout integrated circuit substrate.

At block 602, a sacrificial layer such as a layer of polyimide may be deposited over the reflector metal layer.

At block 604, one or more openings (e.g., vias) may be formed (e.g., etched) in the sacrificial layer to be used for coupling detector elements to the readout integrated circuit.

At block 606, a first absorbing dielectric layer such as a layer of silicon nitride (e.g., $Si_3N_4$) may be deposited on the sacrificial layer. If desired, one or more additional layers such as a first dielectric layer (e.g., a silicon oxide layer) may optionally be deposited on the sacrificial layer prior to depositing the first absorbing dielectric layer so that the first absorbing dielectric layer is deposited over the first dielectric layer and on one or more of the additional layers. In some embodiments, a metal enhancing layer may be formed over the first absorbing dielectric layer.

At block 608, a layer of temperature dependent resistive material such as vanadium oxide may be deposited on the first absorbing dielectric layer. Portions of the temperature dependent resistive material may then be removed in an etch or liftoff operation to define light sensitive portions of the microbolometer array.

At block 610, one or more openings (e.g., vias) may be formed (e.g., etched) in the first absorbing dielectric layer to remove portions of the first absorbing dielectric layer disposed within the openings formed at block 604.

At block 612, a layer of leg metal material may be deposited (e.g., on portions of the first absorbing dielectric layer, the layer of temperature sensitive resistive material, and/or the sacrificial layer). The leg metal material may, for example, include titanium, nickel chromium, and/or other suitable conductive materials.

At block 614, a second absorbing dielectric layer such as a second layer of silicon nitride (e.g., $Si_3N_4$) may be deposited over the layer of temperature dependent resistive material. The second absorbing dielectric layer may be deposited on portions of the leg metal material and/or the temperature sensitive resistive material. If desired, one or more additional layers such as a second dielectric layer (e.g., a second silicon oxide layer) may optionally be deposited (e.g., on portions of the leg metal material and/or the temperature sensitive resistive material) prior to depositing the second absorbing dielectric layer so the second absorbing dielectric layer is deposited over the layer of temperature dependent resistive material and on one or more of the additional layers.

At block 616, an etch process may be performed to remove portions of the leg metal layer and/or other layers to define the microbolometer legs and bridges as would be understood by one skilled in the art.

At block 618, an enhanced absorber layer such as a thin layer (e.g., a layer having a thickness of between 10 Angstroms and 1500 Angstroms) of oxidizing metal (e.g., titanium, a titanium oxide, a combination of Ti and TiOx, aluminum, titanium nitride, nickel, iron, zinc, platinum, tantalum, chrome, other metals, alloys of these metals, and/or combinations of these material and their oxides) may be deposited on the microbolometer structures.

At block 620, portions of the enhanced absorber layer may be removed by performing an etch and/or a liftoff process to remove portions of the enhanced absorber layer and to leave portions of the enhanced absorber layer within the bridge portion and/or the leg portion of the microbolometers. In this way, a metal cap such as a titanium and/or TiOx cap may be formed on each microbolometer, thereby enhancing the responsivity of the microbolometer.

At block 622, the sacrificial layer may be removed (e.g., in an etch process) to release the enhanced responsivity microbolometers of the focal plane array. A space such as an air gap may be generated between the microbolometer bridge and leg portions and the reflector metal layer by the removal of the sacrificial layer.

As would be understood by one skilled in the art, at various stages during the processes of FIG. 6, other layers such as passivation layers, photoresist layers, additional sacrificial layers, antireflection layers, and/or other suitable layers may be deposited, patterned and/or removed in whole or in part to form, for example, the structures of FIGS. 4a-4e.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A microbolometer, comprising:
    a bridge, comprising:
        a temperature sensitive resistive layer;
        one or more first absorbing dielectric layers above the temperature sensitive resistive layer;
        one or more second absorbing dielectric layers below the temperature sensitive resistive layer;
        one or more metal layers electrically isolated from the temperature sensitive resistive layer and above the one or more first absorber dielectric layers and/or below the one or more second absorber dielectric layers; and
        a dielectric layer disposed on each of the one or more metal layers, wherein each of the metal layers is between the dielectric layer and one of the first absorbing dielectric layers or one of the second absorbing dielectric layers.

2. The microbolometer of claim 1, wherein the one or more metal layers comprise a metal that is disposed at or near a top surface of the bridge and/or at or near a bottom surface of the bridge.

3. The microbolometer of claim 1, wherein the one or more metal layers comprise one or more transition metals.

4. The microbolometer of claim 1, wherein the one or more metal layers comprise titanium.

5. The microbolometer of claim 1, wherein the one or more metal layers include a stack of a transition metal and an oxide of the transition metal.

6. The microbolometer of claim 5, wherein the one or more metal layers includes a stack of titanium and titanium oxide.

7. The microbolometer of claim 1, wherein the one or more metal layers have a thickness of between 10 Angstroms and 1500 Angstroms, and wherein the one or more metal layers comprise a first plurality of metal layers below the temperature sensitive resistive layer.

8. The microbolometer of claim 7, wherein:
    the temperature sensitive resistive layer comprises a vanadium oxide, nickel oxide, alpha-silicon, alpha-SiGe, titanium oxide, molybdenum oxide, and/or a diode element;
    the microbolometer is one of a plurality of microbolometers that form a focal plane array; and
    the one or more metal layers further comprise a second plurality of metal layers above the temperature sensitive resistive layer.

9. An infrared camera, comprising:,
    a focal plane array comprising the microbolometer of claim 1; and
    a readout integrated circuit, wherein the bridge is coupled to and suspended above the readout integrated circuit by at least one leg, and wherein the temperature sensitive resistive layer is interposed between the metal layer and the readout integrated circuit.

10. A microbolometer, comprising:
    a bridge, comprising:
        a first dielectric layer;
        a first metal layer formed over the first dielectric layer;
        a second dielectric layer formed over the first metal layer, wherein the second dielectric layer fully or partially encapsulates the first metal layer;
        a temperature sensitive resistive layer; and
        one or more absorbing dielectric layers above the temperature sensitive resistive layer.

11. The microbolometer of claim 10, further comprising:
    a second metal layer formed over a top absorbing dielectric layer; and
    a third dielectric layer that fully or partially encapsulates the second metal layer.

12. The microbolometer of claim 10, further comprising:
    one or more absorbing dielectric layers below the temperature sensitive resistive layer.

13. A method, comprising:
    forming a first metal layer on a readout integrated circuit substrate;
    forming a sacrificial layer on the first metal layer;
    forming one or more first absorber layers over the sacrificial layer;
    forming a temperature sensitive resistive layer on the one or more first absorber layers;
    forming one or more second absorber layers over the temperature sensitive resistive layer;
    forming a second metal layer between the sacrificial layer and the first absorber layers and/or over the second absorber layers;
    forming a dielectric layer between the second metal layer and the sacrificial layer and/or over the second absorber layers; and
    removing the sacrificial layer to form a microbolometer.

14. The method of claim 13, further comprising removing portions of the second metal layer.

15. The method of claim 14, wherein the removing comprises etching the second metal layer.

16. The method of claim 14, wherein the removing comprises lifting off the portions of the second metal layer.

17. The method of claim 13, further comprising etching and/or lift off of the temperature sensitive resistive layer.

18. The method of claim 17, further comprising:
    depositing a leg metal layer on the one or more first absorber layers; and
    etching and/or lift off of the leg metal layer.

19. The method of claim 13, wherein the temperature sensitive resistive layer comprises a vanadium oxide and wherein the second metal layer comprises a titanium layer having a thickness of between 10 Angstroms and 1500 Angstroms.

20. The method of claim 13, further comprising:
prior to depositing the second metal layer, performing etching operations to define bridge portions and leg portions of an array of microbolometers.

21. An imaging device, comprising:
an array of microbolometers; and
a readout integrated circuit, wherein each of the microbolometers is suspended over associated processing circuitry in the readout integrated circuit by at least one metal leg and wherein each microbolometer includes:
a first absorber layer,
a second absorber layer,
a temperature sensitive resistive layer disposed between the first absorber layer and the second absorber layer,
an infrared spectral absorption enhancing metal layer formed on the first absorber layer, wherein the second absorber layer is disposed closer to the readout integrated circuit than the first absorber layer; and
a dielectric layer formed on the infrared spectral absorption enhancing metal layer, wherein the dielectric layer fully or partially encapsulates the infrared spectral absorption enhancing metal layer.

22. The imaging device of claim 21, wherein the infrared spectral absorption enhancing metal layer comprises a titanium layer having a thickness of between 10 Angstroms and 1500 Angstroms.

23. A method of using the imaging device of claim 21, comprising:
providing a bias voltage to each of the microbolometers from the readout integrated circuit; and
receiving a signal from each of the microbolometers at the readout integrated circuit, wherein the signal from each microbolometer corresponds to an amount of infrared light absorbed by that microbolometer.

* * * * *

UNITED STATES PATENT AND TRADEMARK OFFICE
CERTIFICATE OF CORRECTION

PATENT NO. : 9,945,729 B2
APPLICATION NO. : 14/730116
DATED : April 17, 2018
INVENTOR(S) : Robert F. Cannata et al.

It is certified that error appears in the above-identified patent and that said Letters Patent is hereby corrected as shown below:

In the Specification

In Column 4, Line 31, change "vanadium oxide (Vox)" to --vanadium oxide (VOx--.

In the Claims

In Claim 9, Column 12, Line 11, change "comprising:," to --comprising:--.

Signed and Sealed this
Third Day of July, 2018

Andrei Iancu
*Director of the United States Patent and Trademark Office*